No. 639,922. Patented Dec. 26, 1899.
C. JACKSON.
BELT CLAMP.
(Application filed Mar. 9, 1899.)
(No Model.)

Witnesses
A. C. Mellert
A. A. Gordon.

Calvin Jackson, Inventor

By Attorney

THE NORRIS PETERS CO., PHOTO-LITHO., WASHINGTON, D. C.

UNITED STATES PATENT OFFICE.

CALVIN JACKSON, OF PHILADELPHIA, PENNSYLVANIA, ASSIGNOR TO KELLEY BROS. & SPIELMAN, OF SAME PLACE.

BELT-CLAMP.

SPECIFICATION forming part of Letters Patent No. 639,922, dated December 26, 1899.

Application filed March 9, 1899. Serial No. 708,315. (No model.)

*To all whom it may concern:*

Be it known that I, CALVIN JACKSON, a citizen of the United States, residing at Philadelphia, in the county of Philadelphia and State of Pennsylvania, have invented certain new and useful Improvements in Belt-Clamps; and I do hereby declare the following to be a full, clear, and exact description of the invention, such as will enable others skilled in the art to which it appertains to make and use the same.

This invention relates to improvements in belt-clamps.

The object of the invention is to produce a clamp that can be easily and quickly applied and removed and one that will draw up the edges of a belt uniformly and prevent sagging between the points caught by the jaws.

The apparatus is mainly intact, there being no separable parts except the cross-rod, which is of minor importance compared with the invention proper and is often dispensed with.

The invention is fully described in the following specification and clearly illustrated in the accompanying drawings, in which—

Figure 1:
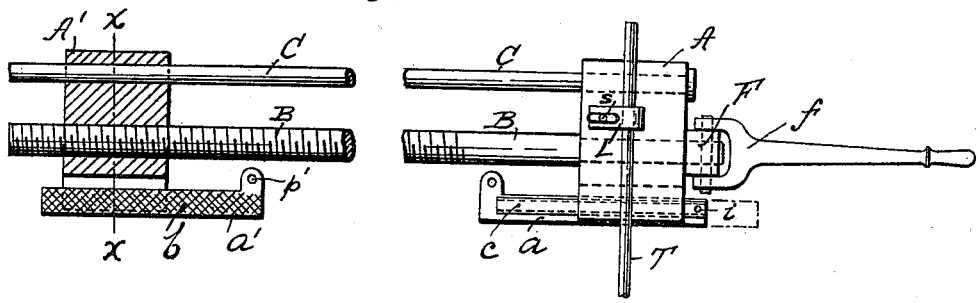
Figure 2:
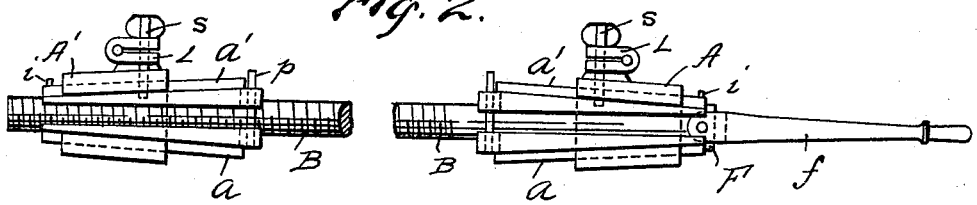
Figure 3:
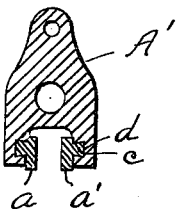

Figure 1 is a plan view. Fig. 2 is a side view. Fig. 3 is a cross-section on line X X, Fig. 1.

The clamp comprises two blocks A and A', each carrying a pair of tapered clamping-jaws $a$ $a'$, having their inner and parallel faces $b$ roughened. The opposite or tapered sides of the jaws are provided with dovetailed ribs $c$, adapted to fit in ways $d$ in the block A A'. A stop-pin $i$ is arranged at the small end of one of the jaws to prevent their withdrawal from the blocks, while their combined width at the larger end is greater than the opening in the block, preventing them from being drawn entirely through said blocks when pulling on the belt. To one of the jaws, at its wide end, is secured a pin $p$, arranged at right angles thereto and adapted to pass through a hole $p'$ in the other jaw, serving as a guide therefor and always keeping their roughened faces parallel.

The block A is mounted on the end of a rod B, whose body is screw-threaded nearly its complete length and is adapted to pass through a screw-threaded hole in the body of the block A'. Immediately back of said rod and parallel with it is arranged a guide-rod C, securely attached to the block A and passing through a hole in the block A'.

The screw-rod B projects sufficiently beyond the block A to form thereon a knuckle-joint F, to which is pivotally secured a jaw-lever $f$, by means of which the screw is rotated, drawing the block A' and the block A together. The use of this jaw-lever and joint F will permit rotation of the screw B, while the lever $f$ is held at any angle thereto. To the upper face of the blocks may be arranged a set-screw $s$, passing through a split lug L and entering the body of the block. A cross-rod T is held in these lugs by tightening the screws, which rod is intended to keep the belt from sagging while being drawn together.

The clamp is applied—one to each side of the belt near the ends to be joined—by inserting the belt between the jaws, and the drawing together of the blocks A and A', which is caused by rotation of the screw-rod B, will cause the jaws $a$ $a'$ to tighten in the tapered grooves of the blocks and more securely grip the belt, prevent slipping, and insure bringing the edges of the belt together evenly, as either pair of clamps may be operated independently of those on the opposite side.

The simplicity of my present construction, and above all the ease with which it may be applied and removed, is evident to all familiar with this class of inventions.

Having thus fully described my invention, its operation and means of application, what I claim as my invention is—

A belt-clamp having two blocks A and A' adapted to be drawn one toward the other by means of a screw-rod formed with a knuckle-joint at one end thereof and having a jaw-lever attached thereto, a guide-rod C joining said blocks, a pair of clamping-jaws having tapered sides formed with dovetailed ribs adapted to travel in ways in said blocks, a guide-pin secured to one of said jaws at right angles thereto and passing through the other jaw, said jaws having roughened parallel faces adapted to catch the sides of the belt to be operated upon, substantially as set forth.

In testimony whereof I affix my signature in presence of two witnesses.

CALVIN JACKSON.

Witnesses:
HENRY M. JACKSON,
W. R. HUMMEL.